United States Patent [19]
Yamamoto et al.

[11] Patent Number: 4,969,078
[45] Date of Patent: Nov. 6, 1990

[54] PUSH-PULL CURRENT-FED DC-DC CONVERTER

[75] Inventors: Katsuhiko Yamamoto, Tokyo; Satoshi Ohtsu, Tokorozawa; Takashi Yamashita, Tokyo, all of Japan

[73] Assignee: Nippon Telegraph and Telephone Corporation, Tokyo, Japan

[21] Appl. No.: 394,153

[22] Filed: Aug. 15, 1989

Related U.S. Application Data

[63] Continuation of Ser. No. 230,824, Aug. 11, 1988, abandoned.

[30] Foreign Application Priority Data

Aug. 21, 1987 [JP] Japan .................................. 62-209090
Sep. 14, 1987 [JP] Japan .................................. 62-228557

[51] Int. Cl.$^5$ .......................................... H02M 3/335
[52] U.S. Cl. ....................................... 363/24; 336/178; 336/182
[58] Field of Search .................. 363/24, 25, 26, 75; 336/182, 178, 229

[56] References Cited

U.S. PATENT DOCUMENTS 3,885,198 5/1975 Pritchard et al. ............... 315/400 X
4,616,300 10/1986 Santelmann, Jr. ..................... 363/21

FOREIGN PATENT DOCUMENTS 2039156 7/1980 United Kingdom ................ 336/178

*Primary Examiner*—Steven L. Stephan
*Assistant Examiner*—Kristine Peckman
*Attorney, Agent, or Firm*—Pollock, VandeSande and Priddy

[57] ABSTRACT

A push-pull transformer of a push-pull current-fed DC-DC converter is arranged so that the inductance of the primary side of the transformer diminishes equivalently, thereby reducing a conversion loss attributable to a distributed capacitance of the transformer. To equivalently reduce the inductance of the primary side, for instance, a gap is formed in the core of the transformer and/or an inductor is connected in parallel to any one of the windings of the transformer.

18 Claims, 10 Drawing Sheets

PUSH-PULL CURRENT-FED DC-DC CONVERTER

This application is a continuation of Ser. No. 230,824, filed on Aug. 11, 1988, now abandoned.

BACKGROUND OF THE INVENTION

The present invention relates to a low-loss, push-pull current-fed DC-DC converter for yielding DC voltage.

FIG. 1 is a circuit diagram of a conventional push-pull current-fed DC-DC converter. An input capacitor 6 is connected across an input DC power supply 5. One end of DC power supply 5 is connected to respective first ends of a diode 7 and the primary winding a choke coil 8. The other end of the diode 7 is connected via a secondary winding, or feedback winding, of the choke coil 8 to the other end of the DC power supply 5. The primary winding of the choke coil 8 is connected at the other end thereof to the junction of primary windings 2 and 3 of a push-pull transformer 110, and the other ends of the primary windings 2 and 3 are, in turn, connected to the other end of the DC power supply 5 via MOSFETs 9 and 10 serving as main switching elements The MOSFETs 9 and 10 include parasitic diodes 11 and 12, respectively. Across a secondary winding 4 of the transformer 110 there is assumed a capacitor 13 which represents a distributed capacitance of the secondary winding 4. The output of the secondary winding 4 is connected to the input side of a bridge circuit composed of rectifying diodes 14 to 17. Connected to the output side of the bridge circuit are a smoothing capacitor 18 and a load resistor 19.

FIG. 2 shows waveforms occurring at respective parts of the converter depicted in FIG. 1. The switching elements 9 and 10 are supplied at their gates with gate signals $V_{G1}$ and $V_{G2}$ of the same frequency f and the same ON-OFF ratio but displaced 180 degrees apart in phase. When the switching element 9 conducts and current $I_{D1}$ flows therethrough at time $t_0$, current $I_L$ flows from the choke coil 8 into the primary side of the transformer 110 at the same time. As a result, a voltage $-V_T$ is created in each of the primary windings 2 and 3 of the transformer 110, and current flows in the secondary winding 4, charging the distributed capacitance 13. When the voltage across the capacitance 13 (corresponding to voltage $V_T$ on the primary side) exceeds the voltage $V_{out}$ of the output capacitor 18, the rectifying diodes 14 and 17 are turned ON, charging the output capacitor 18 by current $I_{Dr}$. The current $I_{Dr}$ shown in FIG. 2 represents a rectified current which flows through either of the pair of diodes 15 and 16 or the pair of diodes 14 and 17 in FIG. 1, although the current flow is indicated by arrows in FIG. 1 beside only the pair of diodes 14 and 17.

When the switching element 9 is turned OFF at time $t_3$, the diode 7 is immediately turned ON and conducts for a period ($t_3$–$t_4$) during which the switching elements 9 and 10 are both OFF, by virtue of the continuity of the current flowing through the choke coil 8 for the period ($t_0$–$t_3$) during which only the switching element 9 was ON; so that current flows via a route [feedback winding of the choke coil 8 →diode 7 →input power supply 5], thus feeding back the excitation energy of the choke coil 8 to the input power supply 5. Similarly, since the exciting current for the transformer 110 cannot flow to the primary side thereof during this period ($t_3$–$t_4$), a voltage is generated in the transformer winding when the exciting current flows to the secondary side. The exciting current of the transformer 110 acts as a discharging current of the distributed capacitance 13. As a result of this, voltage $V_T$ of the transformer 110 gradually approaches zero. Next, when the switching element 10 is turned ON at time $t_4$, current $I_{D2}$ flows therethrough owing to voltage $V_{DS2}$ applied across the switching element 10 immediately prior to its conduction, and at the same time current $I_L$ flows into the primary side of the transformer 110 from the choke coil 8. In consequence, current flows across the secondary winding 4 as is the case with the above, charging the distributed capacitance 13 in a reverse direction. When the voltage across the capacitance 13 exceeds the output voltage $V_{out}$ across the capacitance 18 at time $t_6$, the rectifying diodes 15 and 16 are turned ON to cause a current $I_{Dr}$ therethrough, by which the output capacitor 18 is charged.

In this way, a voltage which is a multiple of the turns ratio of the transformer 110 is obtained, in the same form as the waveform $V_T$ shown in FIG. 2, on the secondary side of the transformer 110, and this voltage is rectified and output from the DC-DC converter as the output voltage $V_{out}$.

Such a conventional push-pull current-fed DC-DC converter as shown in FIG. 1 employs, in the transformer 110, a no-gap core 100 as depicted FIG. 3, and its excitation inductance is so large that the rate of exciting current contained in the current flowing in the primary winding (2 or 3) of the transformer is very low. The value of this exciting current represents the value of energy stored in the excitation inductance of the transformer. In the case of the transformer of the prior art converter, the energy stored in the excitation inductance is discharged to the secondary side in the first half of the ON period of the main switching element and is sfored in the latter half of the ON period. Even if the exciting current is large, its energy will not be entirely lost, but since it is partly consumed as an increase in the copper loss in the transformer windings, it is usually considered preferable that the value of the exciting current be small. However, the present inventors' analyses have revealed that where a transformer of a high turns ratio is employed in the conventional converter for the purpose of generating a particularly high voltage, an increased distributed capacitance of the transformer would cause an increase of the conversion loss because of the small exciting current. Next, a description will be given, with reference to FIGS. 1 and 2, of the mechanism of the increase in the loss.

In the period during which the main switching element 9 is ON ($t_0$–$t_3$ in FIG. 2), the distributed capacitance 13 on the secondary side of the transformer 110 is charged by a voltage which is negative at the side of the transformer winding marked with the black dot, relative to the other side thereof. When the main switching element 9 is turned OFF at $t_3$, the exciting current of the transformer 110 reduces the charges stored in the distributed capacitance 13 and hence decreases its voltage, because the exciting current flows from the secondary winding 4 at the side indicated by the black dot. The variation in the voltage across the distributed capacitance 13 is similar to the variation in the primary winding voltage $V_T$. Where the charges stored in the distributed capacitance 13 are not reduced to zero until time $t_4$, the turning ON of the main switching element 10 causes the charges in the distributed capacitance 13 to constitute a short-circuit current $I_S$ which is discharged via a route [primary winding 3 of the transformer 110

→main switching element 10 →parasitic →diode 11 of the main switching element 9 →winding 2], resulting in the loss of the energy stored in the distributed capacitance 13 until just before time $t_4$. After the short-circuit current period ($t_4$-$t_5$) the distributed capacitance 13 is charged by current $I_L$ of the boosting choke coil 8 and becomes positive at the black-dot side of the transformer winding. As will be seen from the above, the less the exciting current is, the more the voltage of the distributed capacitance 13 remains undissipated just before time $t_4$ (see waveform $V_T$ in FIG. 2), causing an increase in the loss. Incidentally, in a converter for creating high voltage through use of a transformer having a higher turns ratio, $n_T(=N_{T2}/N_{T1})$, of the number of turns $N_{T2}$ of the secondary winding 4 to the number of turns $N_{T1}$ of the primary winding 2 (or 3), since the value of the distributed capacitance as viewed from the primary side increases correspondingly, the loss by the distributed capacitance will increase; further, the loss increases as the switching frequency, i.e. the conversion frequency $f$ rises.

The above phenomenon will occur also in the case of employing EI or EE cores in the transformer of the push-pull current-fed DC-DC converter, because the cores are joined together with no gap therebetween, providing a large transformer inductance.

In addition to the loss by such a short-circuit current, the prior art has presented a problem that an increase in the conversion frequency $f$ causes an abrupt increase in the loss, since the excitation inductance of the choke coil 8 has heretofore been determined taking only input current ripples into account.

SUMMARY OF THE INVENTION

It is therefore an object of the present invention to reduce the loss attributable to the distributed capacitance of the transformer of the push-pull current-fed DC-DC converter.

It is another object of the present invention to suppress an increase in the loss accompanying an increase in the exciting current of the push-pull transformer and an increase in output ripples, by specifying the ranges in which to select the excitation inductances of the push-pull transformer and the choke coil.

The present invention has a primary feature of setting the excitation inductance of the push-pull current-fed DC-DC converter so that the voltage of the distributed capacitance of a main transformer can be inverted during the period in which both switching elements are in the OFF state.

Moreover, the present invention has another primary feature of defining either one or both of the ranges in which to select the excitation inductances of the push-pull transformer and the choke coil, thereby implementing a high-efficiency, low-ripple and high-frequency push-pull current-fed DC-DC converter.

DESCRIPTION OF THE PREFERRED EMBODIMENTS

[Principle of the Invention]

Figure 1:
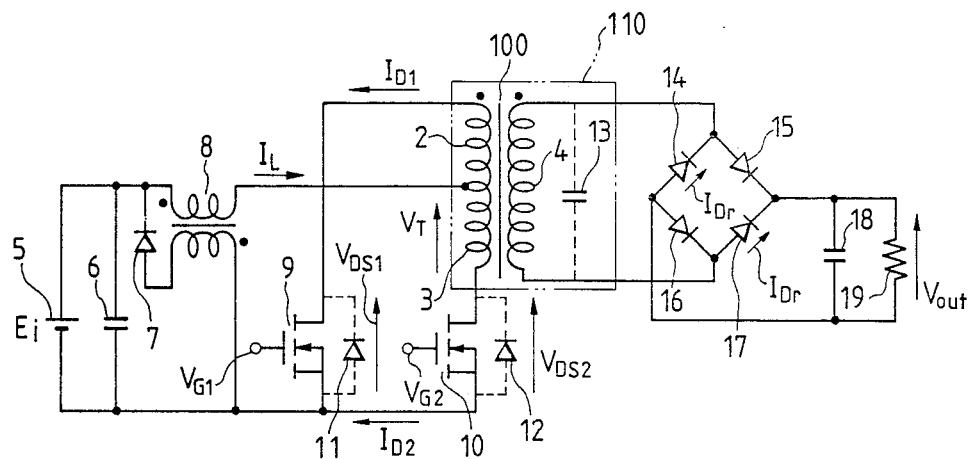
FIG. 1 is a circuit diagram of a conventional push-pull current-fed DC-DC converter.
Figure 3:
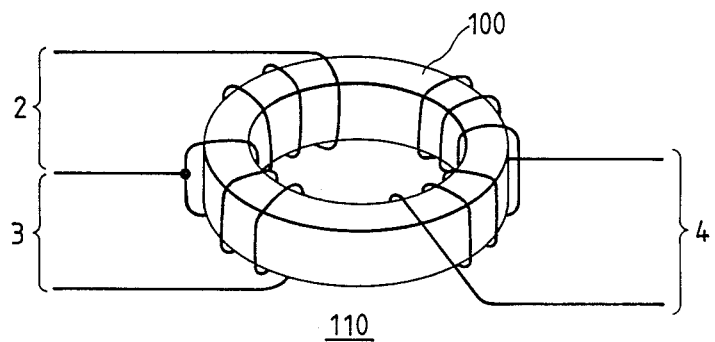
FIG. 3 is a diagram schematically showing an example of a push-pull transformer for use in the converter shown in FIG. 1.
Figure 2:
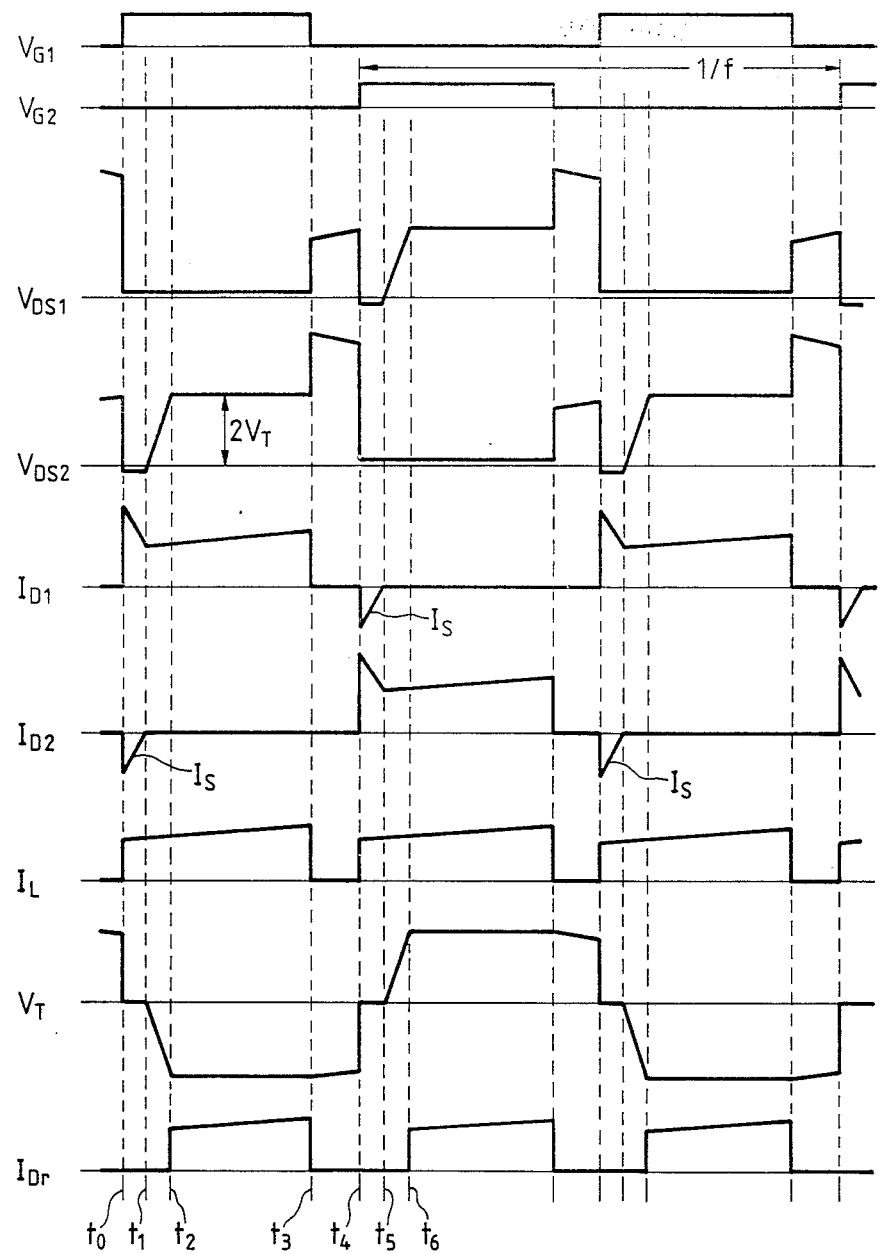
FIG. 2 is a diagram showing waveforms occurring at respective parts of the converter depicted in FIG. 1, for explaining its operation.

To hold down an increase in the loss by the distributed capacitance of the transformer, the polarity of its voltage is inverted by the exciting current of the transformer in the period in which the switching elements 9 and 10 are both in the OFF state. To perform this, it is necessary that the total amount of charges of the exciting current in the period ($t_3$-$t_4$) during which both switching elements 9 and 10 are in the OFF state be larger than the amount of charges needed for inverting the distributed capacitance voltage.

The amount of charges received from the exciting current in the period ($t_3$-$t_4$) is given by the following equation (1):

$$Q_{cur} = \int_{t_3}^{t_4} i_{Te}(t)dt \qquad (1)$$

Where $Q_{cur}$ is the amount of charges received from the exciting current in the period ($t_3$-$t_4$) and $i_{Te}$ is the exciting current of the transformer.

Now, regarding the exciting current $i_{Te}$ in the period ($t_3$-$t_4$) as equal to its peak value and as constant because of its small amount of variation in this period, let it be assumed that the exciting current in this period is $I_{Te}$ which is its peak value. On this assumption the amount of charges $Q_{cur}$ received from the exciting current can be expressed by the following equation (2):

$$Q_{cur} = \frac{0.5 - D}{f} \cdot I_{Te} \qquad (2)$$

Where D is the duty ratio, i.e. the ON-OFF ratio (the rate of the ON period to one cycle) and f is the conversion frequency.

The amount of charges $Q_{cd}$ needed by the distributed capacitance is given by the following equation (3):

$$Q_{cd} = 2 \cdot (N_{T1}/N_{T2}) \cdot V_o \cdot C_d \qquad (3)$$

where $N_{T1}$ is the number of turns of the primary winding of the transformer, $N_{T2}$ is the number of turns of the secondary winding of the transformer, $Q_{cd}$ is the amount of charges needed by the distributed capacitance, $C_d$ is the primary conversion value of the distributed capacitance, and $V_o$ is an output voltage.

To operate the converter without incurring the loss by the shorting of the exciting current, it is necessary to satisfy the relationship shown by the following inequality (4):

$$Q_{cd} \leq Q_{cur} \qquad (4)$$

From expressions (2) to (4) the exciting current needs to satisfy the condition of the following inequality (5):

$$I_{Te} \geq \frac{f}{0.5 - D} \cdot 2 \cdot \frac{N_{T1}}{N_{T2}} \cdot V_0 \cdot C_d \qquad (5)$$

The exciting current of the transformer is determined by the number of turns of its windings, the core constant and the voltage to be applied to the transformer.

The maximum magnetomotive force $H_m$ and the maximum magnetic flux density $B_m$ of the transformer are given by the following equations (6) and (7), respectively:

$$H_m = \frac{N_{T1} \cdot I_{Te}}{l_e} \qquad (6)$$

where $l_e$ is the effective magnetic path length of the core of the transformer $$B_m = \frac{\frac{1}{2} \int_0^{1/f} V_T(t)dt}{N_{T1} \cdot A_e} \qquad (7)$$

where $V_T(t)$ is the voltage to be applied to the primary windings of the transformer and $A_e$ is the effective cross-sectional area of the core of the transformer.

Here, a time integration value of voltage for a half cycle thereof, which is the numerator on the right side of Eq. (7), can be given by the following equation (8):

$$\int_0^{1/f} V_T(t)dt = \frac{1}{2f} \cdot \frac{N_{T1}}{N_{T2}} \cdot V_0 \qquad (8)$$

From Eqs. (7) and (8) the maximum magnetic flux density $B_m$ can therefore be expressed as follows:

$$B_m = \frac{V_0}{4 \cdot f \cdot N_{T2} \cdot A_e} \qquad (9)$$

Further, the maximum magnetomotive force $H_m$ and the maximum magnetic flux density $B_m$ bear the relationship given by the following equation (10):

$$B_m = \mu_0 \cdot \mu \cdot H_m \qquad (10)$$

where $\mu_0$ is the space permeability and $\mu$ is the relative magnetic permeability.

Therefore, the exciting current $I_{Te}$ which depends on the material and the constitution of the transformer can be obtained, from Eqs. (6), (9) and (10), as follows:

$$I_{Te} = \frac{V_0 \cdot l_e}{4 \cdot \mu_0 \cdot \mu \cdot f \cdot N_{T1} \cdot N_{T2} \cdot A_e} \qquad (11)$$

Based on Eq. (11) there are the following methods for increasing the exciting current $I_{Te}$, and their merits and demerits are as follows:

(a) Effective magnetic path length: An increase in the effective magnetic path length increases the volume of the core, leading to an increase in iron loss.
(b) Number of turns of the primary winding: A decrease in the number of turns of the primary winding increases the maximum magnetic flux density, not only causing an increase in iron loss but also incurring the possibility of the transformer being saturated.
(c) Effective cross-sectional area of the core: A decrease in the effective cross-sectional area of the core increases the maximum magnetic flux density, not only causing an increase in iron loss but also incurring the possibility of the transformer being saturated.
(d) Relative magnetic permeability: The relative magnetic permeability can easily be reduced by a suitable selection of the core material, and the iron loss depends on the characteristic of the core used.

Comparison of the above four methods has revealed that the use of a core of a low relative magnetic permeability permits arbitrary setting of the exciting current without increasing the loss.

Figure 4:
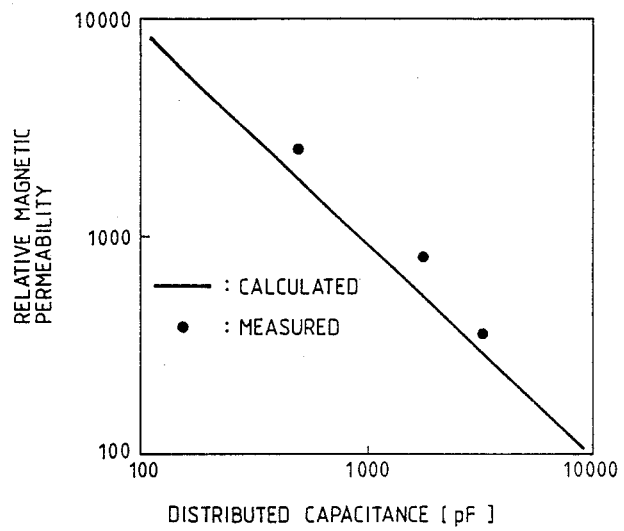
FIG. 4 is a graph showing the relationship between the relative magnetic permeability and the distributed capacitance of a transformer which satisfies the condition based on the principle of the present invention.

The relationship between the distributed capacitance and the relative magnetic permeability for the operation which does not increase the loss, based on expressions (5) and (11), is shown by the following inequality (12). FIG. 4 shows, by way of example, calculated results by a solid line obtainable from Ineq. (12), the experimentally measured results being shown by black circles.

$$\mu \leq \frac{(0.5 - D) \cdot l_e}{8 \cdot \mu_0 \cdot f^2 \cdot N_{T1}^2 \cdot A_e} \cdot \frac{1}{C_d} \qquad (12)$$

The measured results are in good agreement with the results obtained from the formula on the right hand side of inequality (12): this indicates the adequacy of the formula. Expressing Ineq. (12) in terms of the excitation inductance $L_{T1}$, the following inequality (13) is obtained:

$$L_{T1} \leq \frac{0.5 - D}{8 \cdot f^2 \cdot C_d} \qquad (13)$$

where $L_{T1}$ is the inductance of the primary winding of the transformer which is known to be expressed by the following expression:

$$L_{T1} = \frac{\mu \cdot \mu_0 \cdot Ae \cdot N_{T1}^2}{l_e}$$

[Embodiments]

Figure 5:
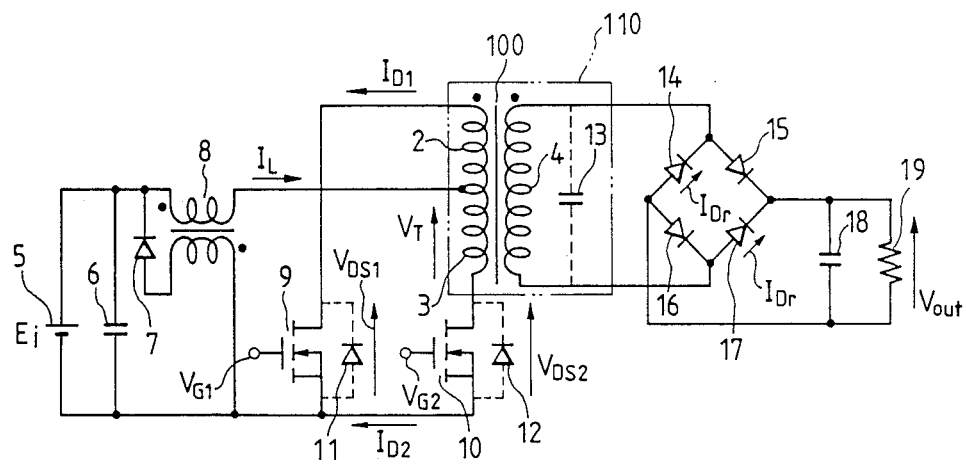
FIG. 5 is a circuit diagram of the push-pull current-fed DC-DC converter of the present invention.

FIG. 5 is a circuit diagram illustrating a typical embodiment of the push-pull current-fed DC-DC converter of the present invention. The circuit arrangement of this embodiment is identical with that of FIG. 1 except that the push-pull transformer 110 is designed so that the relative magnetic permeability has such a small value as will satisfy the condition of Ineq. (12) as mentioned above, or so that the inductance of the primary winding of the transformer will satisfy Ineq. (13).

Figure 6:
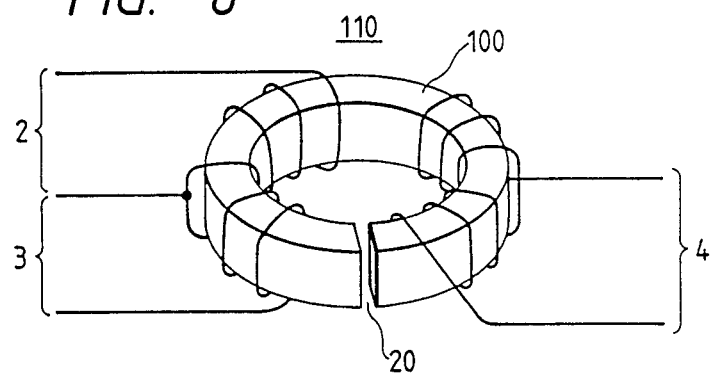
FIG. 6 is a diagram schematically illustrating an example of a transformer for use in the transformer of the present invention.
Figure 7:
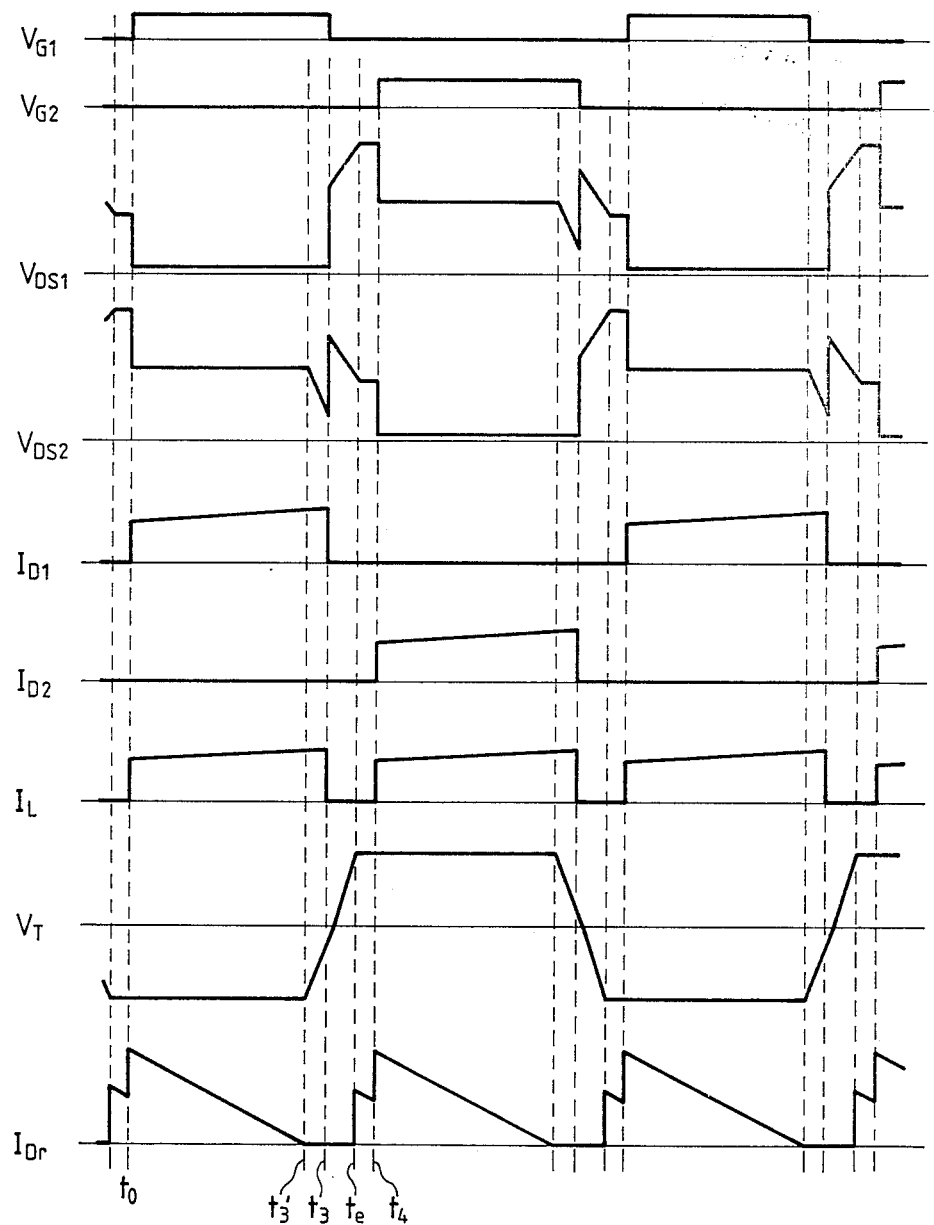
FIG. 7 is a diagram showing waveforms occurring at respective parts of the converter depicted in FIG. 5, for explaining its operation.

FIG. 6 illustrates a specific operative example of the push-pull transformer 110. In this example the relative magnetic permeability of the transformer 110 is reduced equivalently by forming a gap 20 in a toroidal core 100. As a result of this, the excitation inductance of the transformer 110 decreases, permitting an increase in the exciting current of the transformer in the embodiment shown in FIG. 5. FIG. 7 shows waveforms occurring at respective parts of the converter depicted in FIG. 5. Since the exciting current of the transformer 110 increases, it is possible to charge the distributed capacitance 13 in the reverse direction and invert its polarity. Accordingly, the primary winding voltage $V_T$ is also inverted immediately before time $t_4$ at which the switching element 10 is turned ON. At this time, even if the switching element 10 is turned ON, charges stored in the distributed capacitance 13 will not be discharged, as a primary current, via the parasitic diode 11 of the switching element 9, because it is being supplied with a reverse voltage. This eliminates the possibility of the loss attributable to the distributed capacitance 13.

During the time period between $t_e$ and $t_4$ the exciting current of the transformer 110 is supplied as a load current from the secondary side of the transformer through the diodes 15 and 16 to the capacitance 18; so that even if the exciting current increases, it is mostly used effectively though its copper loss somewhat increases.

The core 100 of the relative magnetic permeability $\mu$ which satisfies Ineq. (12) can be implemented by selecting the length $l_g$ of the gap 20 as follows:

$$l_g \geq \frac{\mu' - \mu}{\mu \cdot \mu'} \cdot l_e \qquad (14)$$

where $\mu'$ is the relative magnetic permeability of the core material used.

The reason for which the exciting current is increased by the gap 20 can also be explained as follows: Letting the relative magnetic permeability of the core 100 including the gap 20, the magnetic permeability of a space, the magnetomotive force and the magnetic flux be represented by $\mu$, $\mu_0$, H and B, respectively, $B = \mu \cdot \mu_0 \cdot H$. The provision of the gap 20 in the core 100 will make the relative magnetic permeability $\mu$ lower than in the case where no such gap is provided. Since the provision of the gap 20 does not cause any change in the magnetic flux B, the magnetomotive force H ($= B/\mu/\mu_0$) increases, with the result that the exciting current increases. With the increased exciting current, the voltage of the distributed capacitance 13 falls rapidly in the period ($t_3$-$t_4$) during which the main switching elements 9 and 10 are both in the OFF state, as referred to previously.

Figure 8A:
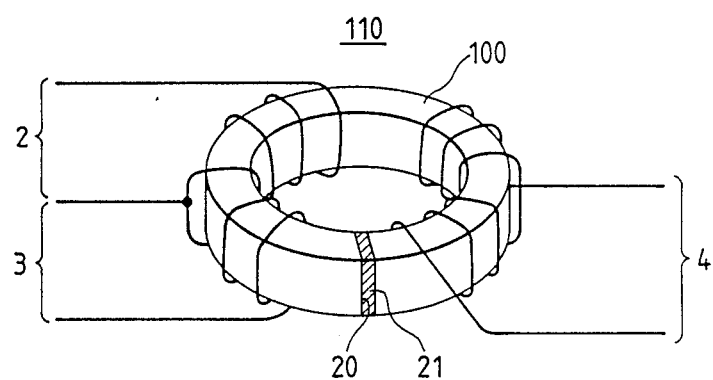
FIGS. 8A and 8B are diagrams schematically illustrating other examples of transformers for use in the converter of the present invention.

The gap 20 of the core 100 may also be filled with a non-magnetic substance 21 as depicted in FIG. 8A. Letting the relative magnetic permeability of the non-magnetic substance 21 be represented by $\mu''$, Ineq. (14) will become as follows:

$$l_g \geq \frac{\mu'' \cdot (\mu' - \mu)}{\mu \cdot (\mu' - \mu'')} \cdot l_e \qquad (14)'$$

Without the non-magnetic substance 21, there is a risk that a temperature change will cause a change in the diameter of the core 100 and consequently a change in the gap length which leads to a change in the relative magnetic permeability $\mu$ of the core 100, but the filling of the gap 21 with the non-magnetic substance 21 suppresses variations in the relative magnetic permeability $\mu$ which would otherwise result from temperature variations. Moreover, the non-magnetic substance 21 is effectively utilized also for protecting the transformer from stresses by impregnation with an insulator.

Figure 8B:
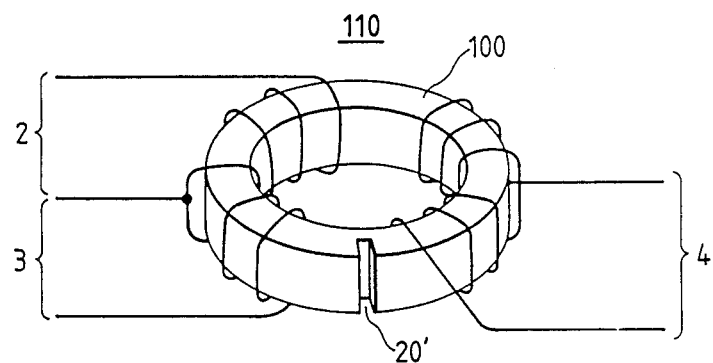

While in the above a toroidal core is employed as the core of the transformer, a similar low-loss structure can be achieved also by providing a gap in an EI, EE or similar core. It is also possible to provide a portion of a small cross-sectional area in the core 100 constituting a magnetic path, by forming a notch 20' in the core 100 as shown in FIG. 8B or drilling a hole in the core 100 though not shown, instead of forming the gap in the core.

It is a matter of course that the same effect as mentioned above would be obtainable by using a magnetic substance of low magnetic permeability for the core 100 of a high-voltage transformer 110, even if the above-mentioned gap is not provided.

Figure 9:
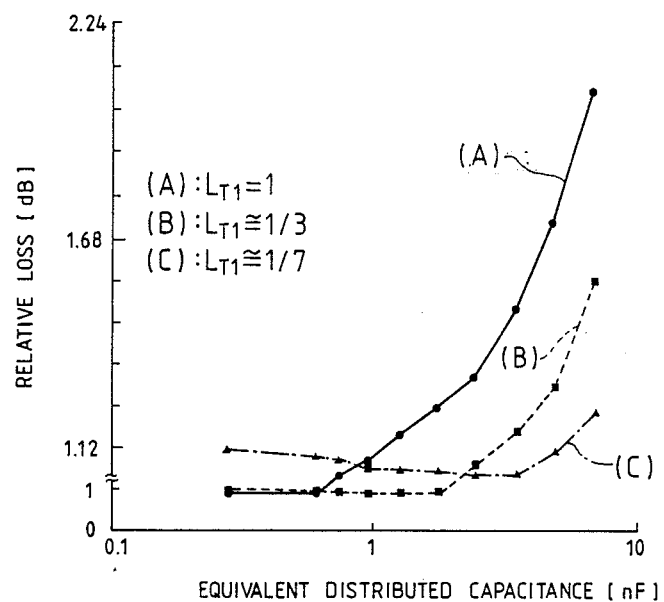
FIG. 9 is a graph showing the relationship between the conversion loss and the distributed capacitance of the transformer in the case where the inductance of the transformer is reduced on the basis of the principle of the present invention.

FIG. 9 shows measured values of the loss corresponding to the equivalent distributed capacitance which varied with the excitation inductance of the transformer. In FIG. 9 the curve (A) shows the relative loss in the case where the excitation inductance $L_{T1}$ without the gap 20 is represented by 1, and curves (B) and (C) show the relative losses in the case where excitation inductance $L_{T1}$ was reduced to about ⅓ and about 1/7 that in the case of the curve (A), by providing gaps of suitable lengths, respectively. The measured results proved that the gap would decrease the loss, in particular, that an increase in the distributed capacitance would further decrease the loss. For obtaining high voltage, a transformer of a high turns ratio is used and its distributed capacitance is, for example, 5 nF or so. It will be seen that the provision of the gap would markedly decrease the loss in such an instance.

Figure 10:
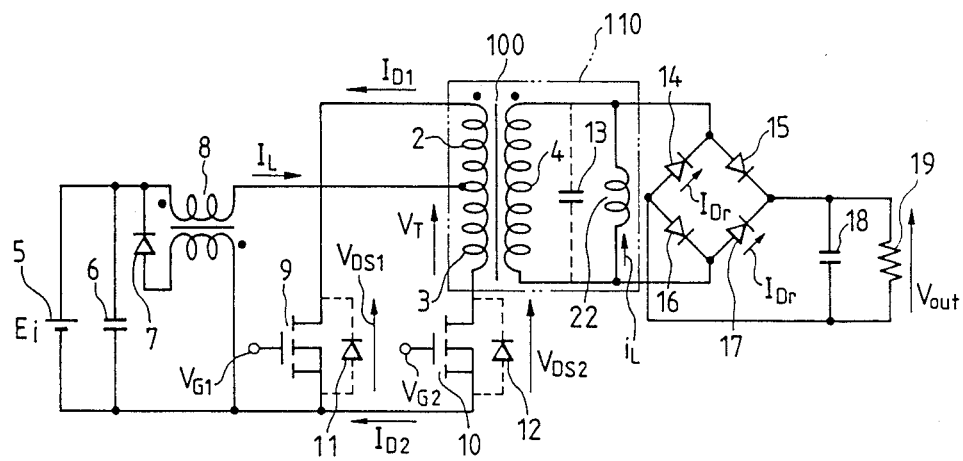
FIG. 10 is a circuit diagram illustrating another embodiment of the converter of the present invention.

FIG. 10 illustrates an example in which the excitation inductance of the push-pull transformer 110 is equivalently reduced by using therefor an arrangement different from that used in FIG. 5. In this example the excitation inductance of the transformer 110 is equivalently reduced by connecting an inductor 22 in parallel to the secondary winding of the transformer 110. The inductance of the inductor 22 is selected such that the value obtained by the parallel connection of its primary-conversion inductance and the excitation inductance of the transformer 110 itself will satisfy Ineq. (13).

Figure 11:
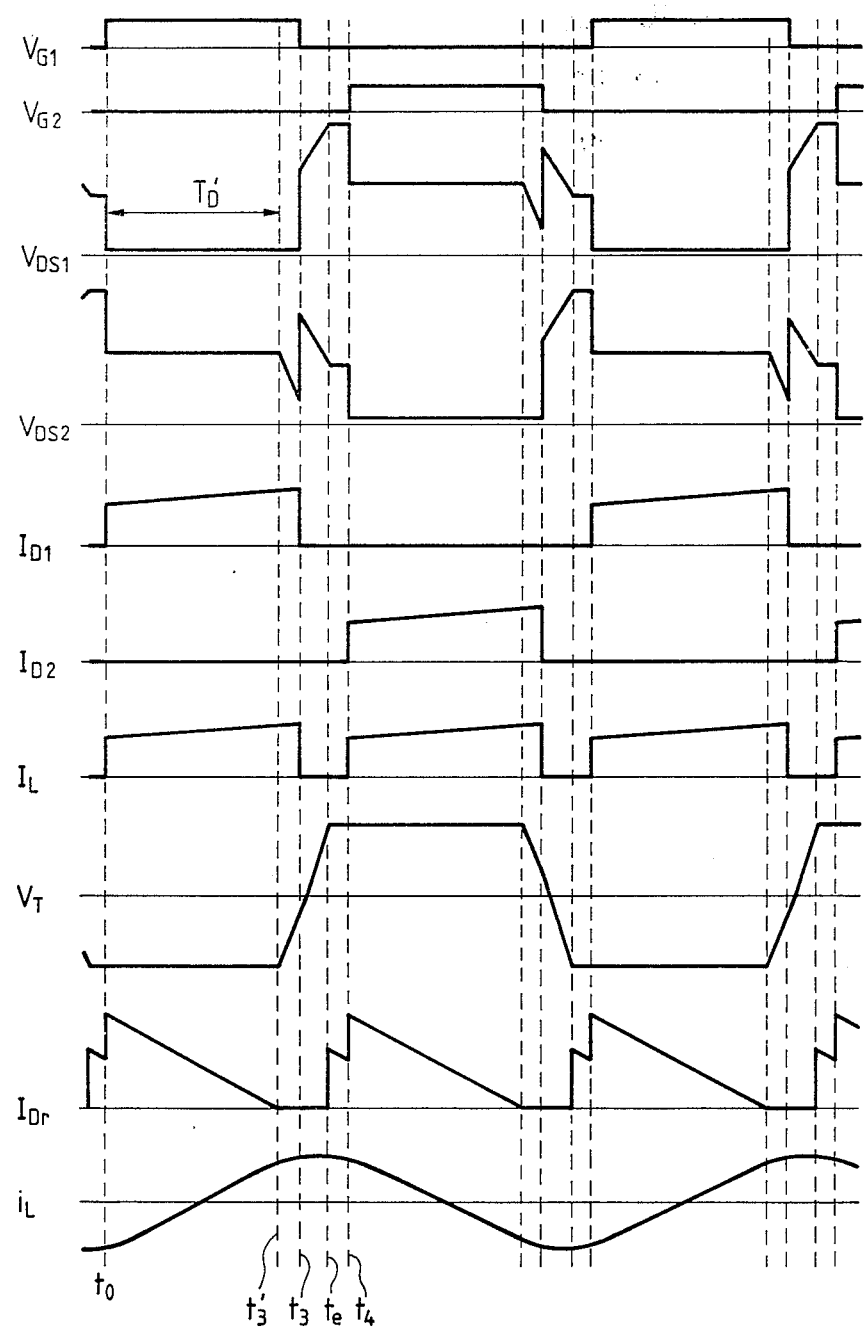
FIG. 11 is a diagram showing waveforms occurring at respective parts of the converter depicted in FIG. 10, for explaining its operation.

FIG. 11 shows the waveforms of voltages $V_{DS1}$ and $V_{DS2}$ of the main switching MOSFETs 9 and 10, voltage $V_T$ of the primary winding 3 of the transformer 110, current $i_L$ of the inductor 22, and operating waveforms occurring at other parts in the circuit depicted in FIG. 10.

The operation of the circuit shown in FIG. 10 will be described in connection with the operation waveforms shown in FIG. 11.

At first, in the period during which the main switching MOSFET 9 is in the ON state ($t_0$–$t_3$ in FIG. 11), the distributed capacitance 13 at the secondary side of the transformer 110 is charged by a voltage which is negative at the side of the transformer winding marked with the black dot, relative to the other side thereof, and at the same time a current $i_L$ flowing across the inductor 22 increases. Upon turning OFF the main switching MOSFET 9 at time $t_3$, charges stored in the distributed capacitance 13 are decreased by the current $i_L$, and the energy stored in the distributed capacitance 13 is converted into the excitation energy of the inductor 22. Accordingly, although the main switching MOSFET 10 is turned ON at time $t_4$, the loss attributable to the distributed capacitance can be decreased, because of the decreased amount of charges of the distributed capacitance 13. The current $i_L$ flowing through the inductor 22 is applied as a load current to a load during a period between $t_e$ and time $t_4$, and hence is not wasted as a loss.

Thus, even if the distributed capacitance 13 of the transformer 110 is large, the loss of the push-pull current-fed DC-DC converter can be held low.

Figure 12:
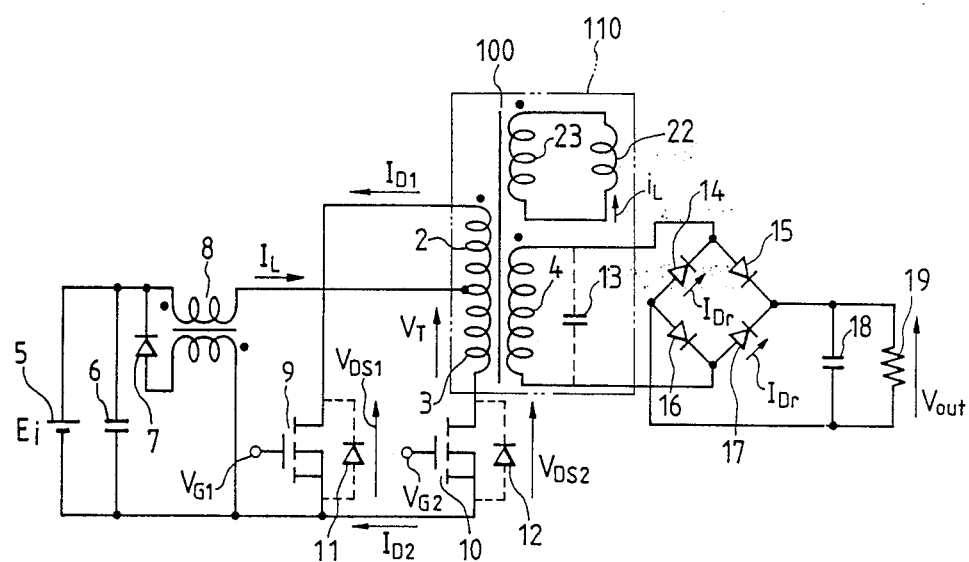
FIG. 12 is a circuit diagram illustrating another embodiment of the converter of the present invention.

FIG. 12 illustrates another modification of the FIG. 5 embodiment which is designed so that the excitation inductance of the transformer 110 is equivalently decreased by employing another structure therefor. In this example, the inductor 22 is connected in parallel to a tertiary winding 23 of the transformer 110, thereby reducing the excitation inductance of the transformer 110 equivalently. The operation of the converter and the effect obtainable in this example are exactly the same as those in the example shown in FIG. 10, and hence will not be described.

Incidentally, the same effect as obtainable in the above example could be produced also by connecting the inductor 22 in parallel to either one or each of the primary windings 2 and 3 of the transformer 110.

Figure 13:
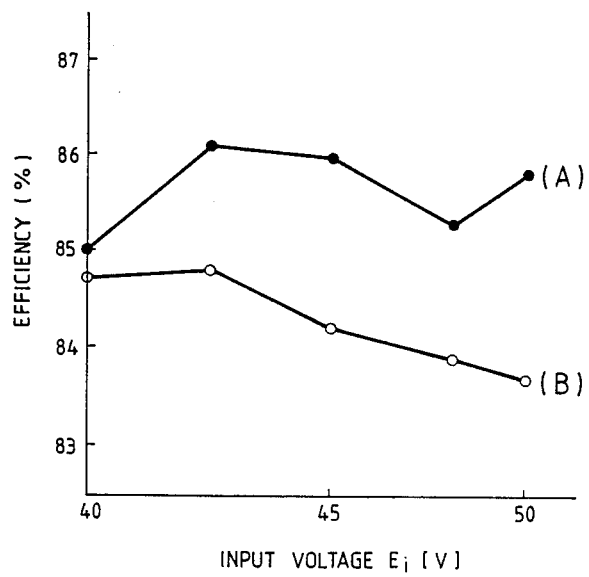
FIG. 13 is a graph showing the efficiency of the converter of FIG. 12 in comparison with the efficiency of the conventional converter.

FIG. 13 shows efficiency characteristics of the converter of the FIG. 18 embodiment and the conventional converter of the FIG. 1 circuit construction by (A) and (B), respectively. The efficiency of the conventional converter is below 85%, whereas with the converter of the present invention an efficiency above 86% could be obtained, due to reduction of the transformer inductance, by the additional provision of the inductor 22 despite its inherent copper and iron losses.

Although the foregoing description has been given of the cases where the relative magnetic permeability of the core 100 of the transformer is held down and where an inductor is connected in parallel to the transformer winding to thereby reduce inductance of the transformer, it will be apparent that both methods can be employed in combination with each other.

[Principle of the Improved Invention]

Figure 14A:
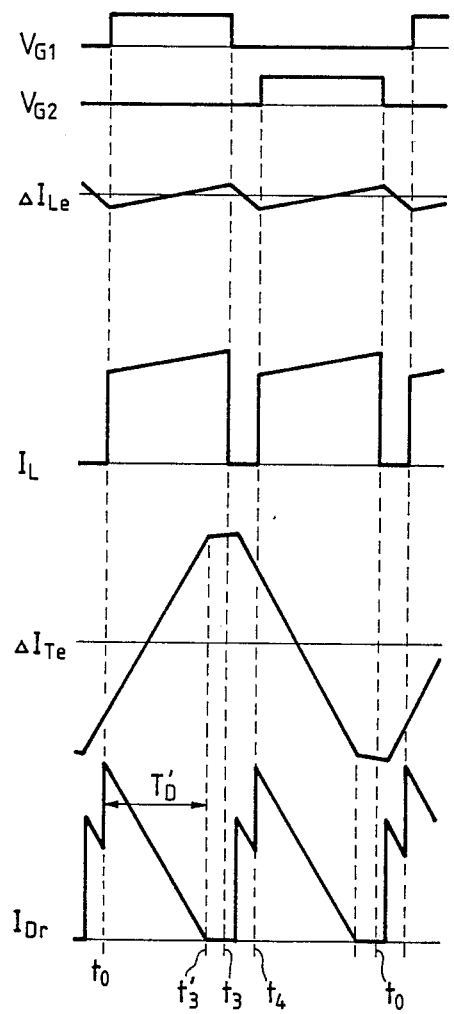
FIG. 14A is a diagram showing waveforms occurring at respective parts of the converter depicted in FIG. 6, for explaining a problem attributable to an increase in the inductance of the transformer.

It has been described previously in connection with the FIGS. 5 and 7 embodiments to design the transformer such that Ineq. (13) is satisfied, so as to decrease the loss attributable to the distributed capacitance of the push-pull transformer 110. In the case where the inductance of the primary winding of the transformer is decreased to satisfy Ineq. (13), however, the exciting current of the transformer increases and the current flowing through the primary side of the transformer is reduced to zero before the switching element 9 is turned OFF. The current $I_L$ flowing through the choke coil 8, its exciting current component $\Delta I_{Le}$, the exciting current $\Delta I_{Te}$ of the transformer 110, and the current $I_{Dr}$ flowing through either the rectifying diodes 14 and 17 or 15 and 16 in FIG. 5, in this case, are shown in FIG. 14A together with variations of the gate signals $V_{G1}$ and $V_{G2}$ of the switching elements 9 and 10. The difference by subtracting the exciting current $\Delta I_{Te}$ of the transformer from the current $I_L$ of the choke coil 8 is the current which flows through the primary side of the transformer, and this current corresponds to a current $I_{Dr}$ which flows through the rectifying diodes 14 and 17 or 15 and 16. Accordingly, as will be seen from FIG. 14A, when the exciting current $\Delta I_{Te}$ of the transformer increases, that is, when the amplitude of the current $\Delta I_{Te}$ becomes large, the current flowing through the primary side of the transformer is reduced to zero (at time $t_3'$) before the switching element 9 is turned OFF as will be seen from the waveform of corresponding diode current $I_{Dr}$. consequence, in the period ($t_3'$–$t_3$) during which the current $I_L$ flows to the choke coil 8 in the conventional converter the diode current $I_{Dr}$ does not flow to the load from the secondary side of the transformer; so that the period during which the rectifying diodes 14 and 17 are in the ON state is equivalently reduced to $T_{D'}$. As a result of this, to obtain the same power as in the case where the above-said period is not reduced, the effective value of the current $I_{Dr}$ flowing through the rectifying diodes increases, causing an increase in the loss during the ON period of the rectifying diodes. In addition, output ripples also increase. Now, a description will be given of design conditions for decreasing the inductance value of the choke coil 8 and reducing the output ripples to the same extent as in the prior art so as to obviate the above defects.

To reduce the output ripples, it is necessary that the current $I_{Dr}$ flowing in either the rectifying diodes 14 and 17 or 15 and 16 at the secondary side of the transformer 110 be made to flow for the same period during which current flows through either the switching element 9 or 10 at the primary side.

In the following the conditions that are required of the inductance of the choke coil 8 and the inductance of the transformer 110 for fulfilling the above-mentioned requirement will be described separately under the titles "step-down voltage mode", "step-up voltage mode" and "combined mode".

(A) Step-down voltage mode

The mode of operation in which the ON-OFF ratio (i.e. the duty ratio) D of the switching elements 9 and 10 is selected such that $0.5 > D \geq 0$ is the step-down voltage mode. The relationship between the input/output voltage of the converter and the duty ratio, an average value $I_{Lav}$ of the current flowing through the choke coil 8, the amplitude $\Delta I_{Le}$ of the exciting current of the choke coil 8, and the amplitude $\Delta I_{Te}$ of the exciting current of the transformer 110 in such a case are expressed by the following equations (15), (16), (17) and (18), respectively.

$$D = \frac{V_L}{2(E_i + V_L - V_c)} \quad (15)$$

$$I_{Lav} = \frac{P_o}{2D \cdot V_c} \quad (16)$$

$$\Delta I_{Le} = \frac{(1 - 2D) \cdot V_L}{2f \cdot L_{L1}} \quad (17)$$

$$\Delta I_{Te} = \frac{V_c}{2f \cdot L_{T1}} \quad (18)$$

In the above, $E_i$ is input DC voltage, $V_c$ is a primary-conversion of output voltage of the transformer, $N_{L1}$ and $N_{L2}$ are the numbers of turns of main and feedback windings of the choke coil, $V_L$ is a primary-conversion voltage of the choke coil 8 given in the form of $V_L = (N_{L1}/N_{L2})E_i$, $P_o$ is the output power of the converter, $L_{L1}$ is the inductance of the main winding of the choke coil 8, and $L_{T1}$ is the primary winding inductance of the transformer 110. Assume that the current flowing through the transformer 110 (corresponding to the current $I_L$ flowing through the main winding of the choke coil) is positive in the direction of a current flow from the choke coil 8 to the primary side of the transformer 110.

<Condition 1>

In order to prevent the current flowing through the transformer 110 from going negative at the time ($t_0$) when the switching element 9 is turned ON, the following inequality (19) must be satisfied:

$$I_{Lav} - \frac{\Delta I_{Le}}{2} - \frac{(1 - 4D)}{2} \cdot \Delta I_{Te} \geq 0 \quad (19)$$

From expressions (19), (16), (17) and (18), the inductance of the main winding of the choke coil 8 needs to satisfy the following inequality (20):

$$\frac{1}{L_{L1}} \leq \frac{f \cdot L_{T1} \cdot P_0 - D \cdot (1 - 4D) \cdot V_c^2}{D \cdot (1 - 2D) \cdot L_{T1} \cdot V_L \cdot V_c} \quad (20)$$

Since the denominator in Ineq. (20) is always positive (D<0.5), there are two cases, depending on whether the numerator is positive or negative.
Case 1: Where the numerator in Ineq. (20) is positive, the following inequalities (21) and (22) must be satisfied:

$$L_{T1} > \frac{D \cdot (1 - 4D) \cdot V_c^2}{f \cdot P_0} \quad (21)$$

$$L_{L1} \geq \frac{D \cdot (1 - 2D) \cdot L_{T1} \cdot V_L \cdot V_c}{f \cdot L_{T1} \cdot P_0 - D \cdot (1 - 4D) \cdot V_c^2} \quad (22)$$

Case 2: The case where the numerator in Ineq. (20) is negative need not be considered because the inductance $L_{T1}$ of the primary winding of the transformer is negative in this case.

<Condition 2>

To prevent the current flowing through the transformer 110 from going negative at the time ($t_3$) when the switching element 9 is turned OFF, the following inequality (23) must be satisfied:

$$I_{Lav} + \frac{\Delta I_{Le}}{2} - \frac{\Delta I_{Te}}{2} \geq 0 \quad (23)$$

From expressions (23), (16), (17) and (18), the inductance $L_{L1}$ of the main winding of the choke coil 8 has to satisfy the following inequality (24):

$$\frac{1}{L_{L1}} \geq \frac{D \cdot V_c^2 - 2f \cdot L_{T1} \cdot P_0}{D \cdot (1 - 2D) \cdot L_{T1} \cdot V_L \cdot V_c} \quad (24)$$

The denominator in Ineq. (24) is always positive (D<0.5). Therefore, there are two cases, depending on whether the numerator is positive or negative.
Case 1: Where the numerator in Ineq. (24) is positive, the following inequalities (25) and (26) must be satisfied:

$$L_{T1} < \frac{D \cdot V_c^2}{2f \cdot P_0} \quad (25)$$

$$L_{L1} \leq \frac{D \cdot (1 - 2D) \cdot L_{T1} \cdot V_L \cdot V_c}{D \cdot V_c^2 - 2f \cdot L_{T1} \cdot P_0} \quad (26)$$

Case 2: Where the numerator in Ineq. (24) is negative, the following inequalities (27) and (28) must be satisfied:

$$L_{T1} \geq \frac{D \cdot V_c^2}{2f \cdot P_0} \quad (27)$$

$$L_{L1} > \frac{D \cdot (1 - 2D) \cdot L_{T1} \cdot V_L \cdot V_c}{D \cdot V_c^2 - 2f \cdot L_{T1} \cdot P_0} \quad (28)$$

Since the numerator in Ineq. (24) is negative, the right side of Ineq. (28) is always negative and the inductance $L_{L1}$ of the main winding of the choke coil may be of an arbitrary value.

Conditions 1 and 2 in the above-described step-down mode (D<0.5) may be summarized as follows:
The following inequality (29) is obtained from Ineq. (21) in Case 1 of Condition 1 and Ineq. (25) in Case 1 of Condition 2, and the following inequality (30) is obtained from Ineq. (22) in Case 1 of Condition 1 and Ineq. (26) in Case 1 of Condition 2:

$$\frac{D \cdot (1 - 4D) \cdot V_c^2}{f \cdot P_0} < L_{T1} < \frac{D \cdot V_c^2}{2f \cdot P_0} \quad (29)$$

$$\frac{D \cdot (1 - 2D) \cdot L_{T1} \cdot V_L \cdot V_c}{f \cdot L_{T1} \cdot P_0 - D \cdot (1 - 4D) \cdot V_c^2} \leq L_{L1} \leq \quad (30)$$

$$\frac{D \cdot (1 - 2D) \cdot L_{T1} \cdot V_L \cdot V_c}{D \cdot V_c^2 - 2f \cdot L_{T1} \cdot P_0}$$

The following inequalities (31) and (32) are obtained from Ineqs. (21) and (27) and Ineq. (24) in Cases 1 and 2 of Conditions 1 and 2, respectively:

$$\frac{D \cdot (1 - 4D) \cdot V_c^2}{f \cdot P_0} < L_{T1} \text{ also,}$$

$$\frac{D \cdot V_c^2}{2f \cdot P_0} \leq L_{T1} \quad (31)$$

$$\frac{D \cdot (1 - 2D) \cdot L_{T1} \cdot V_L \cdot V_c}{f \cdot L_{T1} \cdot P_0 - D \cdot (1 - 4D) \cdot V_c^2} \leq L_{L1} \quad (32)$$

(B) Step-up voltage mode

The mode of operation in which the ON-OFF ratio of the switching elements 9 and 10 is selected such that $1 > D \geq 0.5$ is the step-up voltage mode. The relationship between the input/output voltage of the converter and the ON-OFF ratio D, the average value $I_{Lav}$ of the current flowing through the choke coil 8, the amplitude $\Delta I_{Le}$ of the exciting current of the choke coil 8, and the amplitude $\Delta I_{Te}$ of the exciting current of the transformer 110 in this case are expressed by the following equations (33), (34), (35) and (36), respectively.

$$D = 1 - \frac{E_i}{2 \cdot V_c^2} \quad (33)$$

$$I_{Lav} = \frac{P_0}{2 \cdot (1 - D) \cdot V_c} \quad (34)$$

$$\Delta I_{Le} = \frac{(2D - 1) \cdot V_L}{2f \cdot L_{L1}} \quad (35)$$

$$\Delta I_{Te} = \frac{(1 - D) \cdot V_c}{f \cdot L_{T1}} \quad (36)$$

<Condition 1>

To prevent the current flowing through the transfer 110 from going negative at the time ($t_0$) when the switching element 9 is turned ON, the following inequality (37) must be satisfied:

$$I_{Lav} - \frac{\Delta I_{Le}}{2} - \frac{\Delta I_{Te}}{2} \geq 0 \quad (37)$$

From expressions (37), (34), (35) and (36), the inductance $L_{L1}$ of the main winding of the choke coil 8 must satisfy the following inequality (38):

$$\frac{1}{L_{L1}} \leq \frac{2 \cdot [f \cdot L_{T1} \cdot P_0 - (1 - D)^2 \cdot V_c^2]}{(1 - D) \cdot (2D - 1) \cdot L_{T1} \cdot E_i \cdot V_c} \quad (38)$$

The denominator in Ineq. (38) is positive because $1 > D \geq 0.5$. Therefore, there are two cases, depending on whether the numerator is positive or negative.

Case 1: Where the numerator in Ineq. (38) is positive, the following inequalities (39) and (40) must be satisfied:

$$L_{T1} > \frac{(1 - D)^2 \cdot V_c^2}{f \cdot P_0} \quad (39)$$

$$L_{L1} \geq \frac{(1 - D) \cdot (2D - 1) \cdot L_{T1} \cdot E_i \cdot V_c}{2[f \cdot L_{T1} \cdot P_0 - (1 - D)^2 \cdot V_c^2]} \quad (40)$$

Case 2: Where the number in Ineq. (38) is negative, since the right side of Ineq. (38) is negative, there is no inductance $L_{L1}$ of the main winding of the choke coil which satisfies Ineq. (38).

<Condition 2>

To prevent the current flowing through the transformer 110 from going negative at the time ($t_3$) when the switching element 9 is turned OFF, the following inequality (41) must be satisfied:

$$I_{Lav} + \frac{\Delta I_{Le}}{2} + \frac{\Delta I_{Te}}{2} \geq 0 \quad (41)$$

Since the currents $I_{Lav}$, $\Delta I_{Le}$ and $L_{Te}$ are all positive or zero, Ineq. (41) is always satisfied.

Conditions 1 and 2 in the above step-up mode ($1 > D \geq 0.5$) may be summarized into the following inequalities (42) and (43):

$$L_{T1} > \frac{(1 - D)^2 \cdot V_c^2}{f \cdot P_0} \quad (42)$$

$$L_{L1} \geq \frac{(1 - D) \cdot (2D - 1) \cdot L_{T1} \cdot E_i \cdot V_c}{2[f \cdot L_{T1} \cdot P_0 - (1 - D)^2 \cdot V_c^2]} \quad (43)$$

(C) Combined mode

In the case of operating the converter while arbitrarily changing the ON-OFF ratio D of the switching elements 9 and 10 in the range of from 0 to 1, the inductance $L_{T1}$ of the primary winding of the transformer 110 and the inductance $L_{L1}$ of the main winding of the choke coil 8 need only to be set to a value which satisfies Ineqs. (13), (29), (31) and (42) at the same time and a value which satisfies Ineqs. (30), (32) and (43) at the same time, respectively.

[Embodiment of the Improved Invention]

Figure 14B:
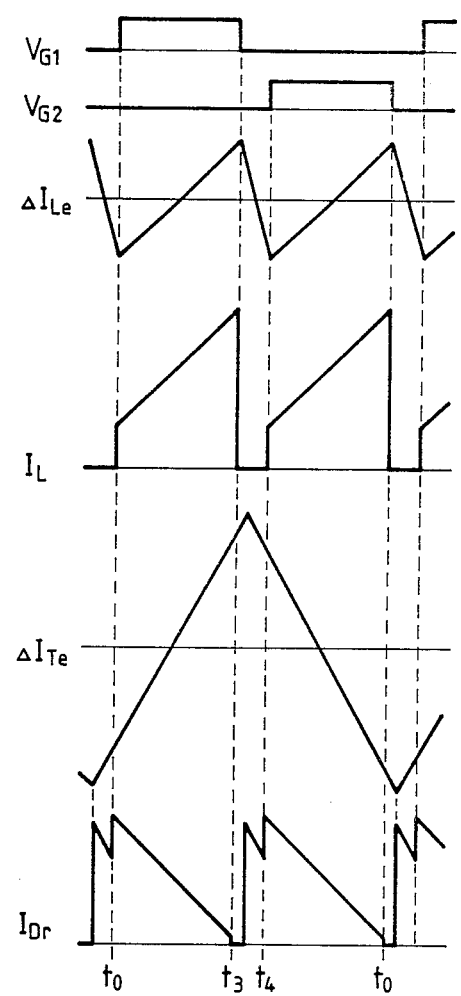
FIG. 14B is a diagram showing waveforms occurring at respective parts of the converter depicted in FIG. 6, for explaining operations in the case of solving the problem described in connection with FIG. 14A.

FIG. 14B shows operating waveforms at respective parts of the converter depicted in FIG. 5 in the case where the inductance $L_{T1}$ of the primary winding of the transformer 110 and the inductance $L_{L1}$ of the main winding of the choke coil 8 each have a value which satisfies Ineqs. (13), (29), (30), (31) and (32) and the converter is operated in the step-down voltage mode.

By decreasing the inductance $L_{L1}$ of the choke coil 8 and increasing the amplitude $\Delta I_{Le}$ of the exciting current of the choke coil 8, it is possible to prevent that the current flowing through the primary side of the transformer 110 and consequently the current $I_{Dr}$ flowing through the rectifying diode are reduced to zero before either the switching element 9 or 10 is turned OFF. This eliminates the possibility of reducing the ON period of either the rectifying diodes 14 and 17 or 15 and 16 by an increase in the exciting current of the transformer 110, thus ensuring prevention of the loss and an increase of the output ripples by an increase in the effective value of the current $I_{Dr}$ flowing through either the rectifying diodes 14 and 17 or 15 and 16.

A description will be given of an example of the range in which to select the values of the inductance $L_{T1}$ of the transformer 110 and the inductance $L_{L1}$ of the choke coil 8 in the case of the converter operating in the step-down voltage mode alone, for example.

Figure 15:
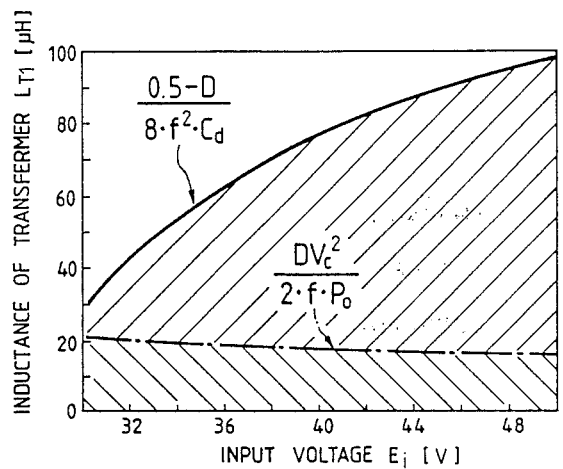
FIG. 15 is a graph showing an example of the relationship between the inductance of the transformer and input voltage which fulfills the condition for implementing improved operations.

FIG. 15 shows the relationship between the input voltage $E_i$ and the inductance $L_{T1}$ of the transformer 110. In FIG. 15 the range of the inductance $L_{T1}$ in Case 1 satisfies the conditions of Ineqs. (13) and (31) at the same time.

Figure 16:
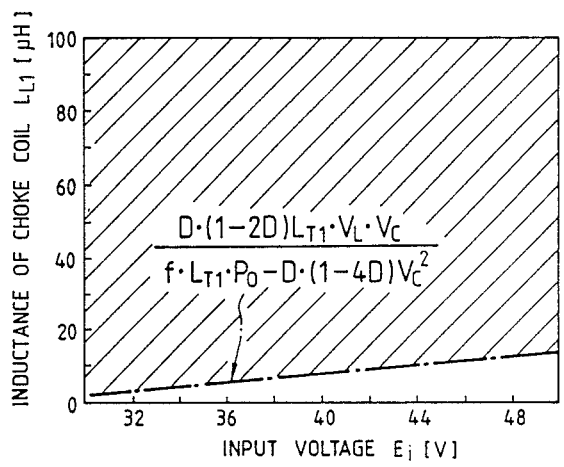
FIG. 16 is a graph showing an example of the relationship between the inductance of the choke coil and input voltage which fulfills the condition for implementing improved operations.
Figure 17:
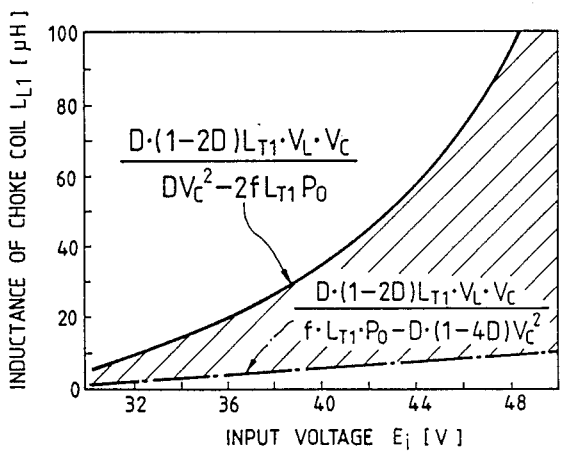
FIG. 17 is a graph showing another example of the relationship between the inductance of the transformer and input voltage which satisfies the condition for implementing improved operations.

To prevent an increase in the loss by the distributed capacitance under the conditions in Case 1, it is necessary that the inductance $L_{T1}$ fulfill the condition of Ineq. (32), and the range therefor is indicated by the hatched region in FIG. 16. To prevent an increase in the loss by the distributed capacitance under the conditions in Case 2, the inductance $L_{L1}$ is required to fulfill the condition of Ineq. (30), and the range therefor is indicated by the hatched region in FIG. 17.

[Effect of the Invention]

As described above, by designing the inductance of the transformer of the push-pull current-fed DC-DC converter within a certain range, charges stored in the distributed capacitance are converted into excitation energy before they are discharged. This produces the effect of avoiding the loss which is attributable to the distributed capacitance of the transformer in the prior art.

Furthermore, the converter of the present invention has the advantage of supplying power to a load without reducing the pulse width of the output current, by selecting the inductance of the primary winding of the transformer 110 and the excitation inductance of the main winding of the choke coil 8 such that they satisfy the afore-mentioned inequalities.

Since the switching elements can be operated without reducing the pulse width of the output current as mentioned above and since the period in which to supply energy to the load from the smoothing capacitor 18 is reduced, the capacity of the smoothing capacitor 18 can be decreased and the loss by the distributed capacitance of the transformer 110 can be avoided. Accordingly, the present invention can offer a high efficiency, small-sized and lightweight push-pull current-fed DC-DC converter.

It will be apparent that many modifications and variations may be effected without departing from the scope of the novel concepts of the present invention.

What is claimed is:

1. A push-pull current-fed DC-DC converter comprising:
   DC voltage supply means;
   a choke coil connected in series to said DC voltage supply means;
   a push-pull transformer having series-connected first and second primary windings and a secondary winding wound on a core;
   a rectifier connected to said secondary winding of said push-pull transformer, for rectifying its output;
   a smoothing circuit for smoothing the rectified output of said rectifier; and
   first and second switching elements connected each at one end thereof to respective ends of the series connection of said first and second primary windings, said switching elements being connected at their other ends to each other, each of said first and second switching elements being of a type having a parasitic diode connected in parallel thereto;
   wherein said interconnected other ends of said first and second switching elements and the junction of said first and second primary windings are connected across the series connection of said DC voltage supply means and said choke coil; and
   wherein an inductance $L_{T1}$ of the primary side of said push-pull transformer satisfies the following inequality:

$$L_{T1} \leq \frac{0.5 - D}{8 \cdot f^2 \cdot C_d}$$

where D is the ON-OFF ratio of said first and second switching elements, f is its ON-OFF frequency, and $C_d$ is a primary-conversion value of a distributed capacitance parasitic on said push-pull transformer.

2. The converter of claim 1, wherein the core of said push-pull transformer has a gap formed in a magnetic path thereof.

3. The converter of claim 1, wherein the core of said push-pull transformer has a portion of reduced cross-section.

4. The converter of claim 1, 2 or 3, wherein an inductor is connected in parallel with at least one of said first and second primary windings and said secondary winding of said push-pull transformer.

5. The converter of claim 1, 2 or 3, wherein said push-pull transformer has a tertiary winding on said core and an inductor is connected in parallel with said tertiary winding.

6. The converter of claim 1, 2 or 3, wherein the relative magnetic permeability $\mu$ of the core of said push-pull transformer satisfies the following inequality:

$$\mu \leq \frac{l_e (0.5 - D)}{8 \cdot \mu_o \cdot f^2 \cdot N_1^2 \cdot A_e \cdot C_d}$$

Where $A_e$ and $l_e$ are the effective cross-sectional area and the effective magnetic path length of said core, $\mu_0$ is the space permeability, and $N_1$ is the number of turns of each of said first and second primary windings.

7. The converter of claim 2, wherein the relative magnetic permeability of said core satisfies the following expression:

$$\mu \leq \frac{l_e (0.5 - D)}{8 \cdot \mu_o \cdot f^2 \cdot N_1^2 \cdot A_e \cdot C_d}$$

where Ae and $l_e$ are an effective cross-sectional area and effective magnetic path length of said core, respectively, $\mu_0$ is the space permeability, and $N_1$ is the number of turns of each of said first and second primary windings; and
   wherein said gap has a length $l_g$ satisfying the following expression:

$$l_g \geq \frac{\mu'' \cdot (\mu' - \mu)}{\mu \cdot (\mu' - \mu'')} \cdot l_e$$

where $\mu'$ is the relative magnetic permeability of a material of said core and $\mu''$ is the relative magnetic permeability of a material filling said gap.

8. The converter of claim 1, wherein said ON-OFF ratio is $0.5 > D \geq 0$ and the inductance $L_{L1}$ of said choke coil and the inductance $L_{T1}$ of the primary side of said push-pull transformer satisfy the following inequalities:

$$\frac{D \cdot (1 - 4D) \cdot V_c^2}{f \cdot P_o} < L_{T1} < \frac{D \cdot V_c^2}{2 \cdot f \cdot P_o}$$

and $$\frac{D(1 - 2D)L_{T1} \cdot V_L \cdot V_c}{f \cdot L_{T1} \cdot P_o - D(1 - 4D)V_c^2} \leq L_{L1} \leq \frac{D(1 - 2D)L_{T1} \cdot V_L \cdot V_c}{D \cdot V_c^2 - 2f \cdot L_{T1} \cdot P_o}$$

where $P_o$ is the output power from said smoothing circuit, $V_L$ is a primary-conversion voltage of said choke coil, and $V_c$ is a primary-conversion of the output voltage of said push-pull transformer.

9. The converter of claim 1, wherein said ON-OFF ratio is $1 \geq D > 0.5$ and the inductance $L_{L1}$ of said choke coil and the inductance $L_{T1}$ of the primary side of said push-pull transformer satisfy the following inequalities:

$$L_{T1} > \frac{(1-D)^2 \cdot V_c^2}{f \cdot P_o}$$

and $$L_{L1} \geq \frac{(1-D)(2D-1) \cdot L_{T1} \cdot E_i \cdot V_c}{2[f \cdot L_{T1} \cdot P_o - (1-D)^2 \cdot V_c^2]}$$

where $P_o$ is the output power from said smoothing circuit, $V_c$ is a primary-conversion of the output voltage of said push-pull transformer, and $E_i$ is the output voltage from said DC voltage supply means.

10. The converter of claim 1, wherein said inductance $L_{L1}$ of said choke coil and the inductance $L_{T1}$ of the primary side of said push-pull transformer satisfy the following inequalities:

$$\frac{D(1-4D)V_c^2}{f \cdot P_o} < L_{T1} < \frac{D \cdot V_c^2}{2f \cdot P_o},$$

also $$L_{T1} > \frac{(1-D)^2 \cdot V_c^2}{2f \cdot P_o}$$

and $$\frac{D(1-2D)L_{T1} \cdot V_L \cdot V_c}{f \cdot L_{T1} \cdot P_o - D(1-4D)V_c^2} \leq L_{L1} \leq$$

$$\frac{D(1-2D)L_{T1} \cdot V_L \cdot V_c}{D \cdot V_c^2 - 2f \cdot L_{T1} \cdot P_o},$$

also $$L_{L1} \geq \frac{(1-D)(2D-1)L_{T1} \cdot E_i \cdot V_c}{2[f \cdot L_{T1} \cdot P_o - (1-D)^2 \cdot V_c^2]}$$

where $P_o$ is the output power of said smoothing circuit, $V_L$ is a primary-conversion of the voltage of said choke coil, $V_c$ is a primary-conversion of the output voltage of said push-pull transformer, and $E_i$ is the output voltage from said DC voltage supply means.

11. The converter of claim 1, wherein said ON-OFF ratio is $0.5 > D \geq 0$ and the inductance $L_{L1}$ of said choke coil and the inductance $L_{T1}$ of the primary side of said push-pull transformer satisfy the following inequalities:

$$\frac{D(1-4D)V_c^2}{f \cdot P_o} < L_{T1},$$

also $$\frac{D \cdot V_c^2}{2f \cdot P_o} \leq L_{T1},$$

and $$\frac{D(1-2D)L_{T1} \cdot V_L \cdot V_c}{f \cdot L_{T1} \cdot P_o - D(1-4D)V_c^2} \leq L_{L1}$$

where $P_o$ is the output power from said smoothing circuit, $V_L$ is a primary-conversion voltage of said choke coil, and $V_c$ is a primary-conversion of the output voltage of said push-pull transformer.

12. The converter of claim 1, wherein the inductance $L_{L1}$ of said choke coil and the inductance $L_{T1}$ of the primary side of said push-pull transformer satisfy the following inequalities:

$$\frac{D(1-4D)V_c^2}{f \cdot P_o} < L_{T1},$$

also $$\frac{D \cdot V_c^2}{2f \cdot P_o} \leq L_{T1},$$

also, $$\frac{(1-D)^2 \cdot V_c^2}{f \cdot P_o} < L_{T1},$$

and $$\frac{D(1-2D)L_{T1} \cdot V_L \cdot V_c}{f \cdot L_{T1} \cdot P_o - D(1-4D)V_c^2} < L_{L1},$$

also $$\frac{(1-D)(2D-1)L_{T1} \cdot E_i \cdot V_c}{2[f \cdot L_{T1} \cdot P_o - (1-D)^2 \cdot V_c^2]} \leq L_{L1}$$

where $P_o$ is the output power of said smoothing circuit, $V_L$ is a primary-conversion of the voltage of said choke coil, $V_c$ is a primary conversion of the output voltage of said push-pull transformer, and $E_i$ is the output voltage from said DC voltage supply means.

13. The converter of claim 8, 9, 10, 11 or 12 wherein the core of said push-pull transformer has a gap.

14. The converter of claim 8, 9, 10, 11 or 12 wherein the core of said push-pull transformer has a portion of reduced cross-section.

15. The converter of claim 8, 9, 10, 11 or 12 wherein an inductor is connected in parallel with at least one of said first and second primary windings and said secondary winding of said push-pull transformer.

16. The converter of claim 8, 9, 10, 11 or 12 wherein said push-pull transformer has a tertiary winding and an inductor is connected in parallel with said tertiary winding.

17. The converter of claim 8, 9, 10, 11 or 12 wherein the relative magnetic permeability $\mu$ of the core of said push-pull transformer satisfies the following inequality:

$$\mu \leq \frac{l_e(0.5 - D)}{8\mu_0 \cdot f^2 \cdot N_1^2 \cdot A_e \cdot C_d}$$

where $A_e$ and $l_e$ are the effective cross-sectional area and the effective magnetic path length of said core, $\mu_0$ is the space permeability, and $N_1$ is the number of turns of each of said first and second primary windings.

18. The converter of claim 17, wherein the core of said push-pull transformer has a gap and the length $l_g$ of said gap satisfies the following inequality:

$$l_g \geq \frac{\mu'' \cdot (\mu' - \mu)}{\mu \cdot (\mu' - \mu'')} \cdot l_g$$

where $\mu'$ is the relative magnetic permeability of said core and $\mu''$ is the relative magnetic permeability of a material with which said gap is filled.

* * * * *